(12) United States Patent
Proctor, Jr. et al.

(10) Patent No.: US 8,122,134 B2
(45) Date of Patent: Feb. 21, 2012

(54) REDUCING LOOP EFFECTS IN A WIRELESS LOCAL AREA NETWORK REPEATER

(75) Inventors: James A. Proctor, Jr., Melbourne Beach, FL (US); Kenneth M. Gainey, Satellite Beach, FL (US)

(73) Assignee: QUALCOMM Incorporated, San Diego, CA (US)

( * ) Notice: Subject to any disclaimer, the term of this patent is extended or adjusted under 35 U.S.C. 154(b) by 1296 days.

(21) Appl. No.: 10/530,546

(22) PCT Filed: Oct. 9, 2003

(86) PCT No.: PCT/US03/29117
§ 371 (c)(1),
(2), (4) Date: Apr. 7, 2005

(87) PCT Pub. No.: WO2004/034600
PCT Pub. Date: Apr. 22, 2004

(65) Prior Publication Data
US 2006/0041680 A1 Feb. 23, 2006

Related U.S. Application Data

(60) Provisional application No. 60/417,672, filed on Oct. 11, 2002.

(51) Int. Cl.
*H04B 7/14* (2006.01)
*G06F 15/16* (2006.01)
(52) U.S. Cl. ......... 709/228; 709/224; 370/315; 370/341
(58) Field of Classification Search .................. None
See application file for complete search history.

(56) References Cited

U.S. PATENT DOCUMENTS

| | | | |
|---|---|---|---|
| 3,363,250 | A | 1/1968 | Jacobson |
| 4,000,467 | A | 12/1976 | Lentz et al. |
| 4,001,691 | A | 1/1977 | Gruenberg et al. |
| 4,061,970 | A | 12/1977 | Magneron et al. |
| 4,081,752 | A | 3/1978 | Sumi et al. |
| 4,124,825 | A | 11/1978 | Webb et al. |
| 4,204,016 | A | 5/1980 | Chavannes et al. |

(Continued)

FOREIGN PATENT DOCUMENTS

CN 1186401 7/1998

(Continued)

OTHER PUBLICATIONS

Second Office Action issued from the Chinese Patent Office on Jul. 20, 2007 in connection with corresponding Chinese application No. 200380101286.2 (English translation enclosed).

(Continued)

*Primary Examiner* — Patrice Winder
(74) *Attorney, Agent, or Firm* — Linda G. Gunderson

(57) ABSTRACT

A method and apparatus are provided for operating a frequency translating repeater in a wireless local are network (WLAN) having one or more repeaters (200, 204), a network protocol for communicating between one or more base units (100) and one or more client units (104, 105). A first frequency channel may be used for receiving and transmitting, the network protocol defining multiple operating frequencies monitored to detect a transmitted signal. The signal is characterized to determine if associated with the base units. A second frequency channel selected for use by one of the repeaters for retransmission of additional signals based on the characterization.

34 Claims, 5 Drawing Sheets

U.S. PATENT DOCUMENTS

| | | | |
|---|---|---|---|
| 4,334,323 | A | 6/1982 | Moore |
| 4,368,541 | A | 1/1983 | Evans et al. |
| 4,509,206 | A | 4/1985 | Carpe et al. |
| 4,701,935 | A | 10/1987 | Namiki et al. |
| 4,723,302 | A | 2/1988 | Fulmer et al. |
| 4,777,653 | A | 10/1988 | Bonnerot et al. |
| 4,783,843 | A | 11/1988 | Leff et al. |
| 4,820,568 | A | 4/1989 | Harpell et al. |
| 4,922,259 | A | 5/1990 | Hall et al. |
| 5,023,930 | A | 6/1991 | Leslie et al. |
| 5,095,528 | A | 3/1992 | Leslie et al. |
| 5,214,788 | A | 5/1993 | Delaperriere et al. |
| 5,220,562 | A | 6/1993 | Takada et al. |
| 5,280,480 | A | 1/1994 | Pitt et al. |
| 5,333,175 | A | 7/1994 | Ariyavisitakul et al. |
| 5,341,364 | A | 8/1994 | Marra et al. |
| 5,349,463 | A | 9/1994 | Hirohashi et al. |
| 5,368,897 | A | 11/1994 | Kurihara et al. |
| 5,371,734 | A | 12/1994 | Fischer et al. |
| 5,373,503 | A | 12/1994 | Chen et al. |
| 5,383,144 | A | 1/1995 | Kato |
| 5,408,197 | A | 4/1995 | Miyake et al. |
| 5,408,618 | A | 4/1995 | Aho et al. |
| 5,430,726 | A | 7/1995 | Moorwood et al. |
| 5,446,770 | A | 8/1995 | Urabe et al. |
| 5,465,251 | A | 11/1995 | Judd et al. |
| 5,471,642 | A | 11/1995 | Palmer et al. |
| 5,485,486 | A | 1/1996 | Gilhousen et al. |
| 5,509,028 | A | 4/1996 | Marque-Pucheu et al. |
| 5,515,376 | A | 5/1996 | Murthy et al. |
| 5,519,619 | A | 5/1996 | Seda |
| 5,608,755 | A | 3/1997 | Rakib et al. |
| 5,610,916 | A | 3/1997 | Kostreski et al. |
| 5,648,984 | A | 7/1997 | Kroninger et al. |
| 5,654,979 | A | 8/1997 | Levin et al. |
| 5,659,879 | A | 8/1997 | Dupuy et al. |
| 5,678,177 | A | 10/1997 | Beasley |
| 5,678,198 | A | 10/1997 | Lemson et al. |
| 5,684,801 | A | 11/1997 | Amitay et al. |
| 5,697,052 | A | 12/1997 | Treatch et al. |
| 5,726,980 | A | 3/1998 | Rickard et al. |
| 5,732,334 | A | 3/1998 | Miyake et al. |
| 5,745,846 | A | 4/1998 | Myer et al. |
| 5,754,540 | A | 5/1998 | Liu et al. |
| 5,764,636 | A | 6/1998 | Edsall |
| 5,767,788 | A | 6/1998 | Ness |
| 5,771,174 | A | 6/1998 | Spinner et al. |
| 5,784,683 | A | 7/1998 | Sistanizadeh et al. |
| 5,812,933 | A | 9/1998 | Niki |
| 5,815,795 | A | 9/1998 | Iwai et al. |
| 5,825,809 | A | 10/1998 | Sim |
| 5,852,629 | A | 12/1998 | Iwamatsu et al. |
| 5,857,144 | A | 1/1999 | Mangum et al. |
| 5,862,207 | A | 1/1999 | Aoshima |
| 5,875,179 | A | 2/1999 | Tikalsky |
| 5,883,884 | A | 3/1999 | Atkinson |
| 5,884,181 | A | 3/1999 | Arnold et al. |
| 5,890,055 | A | 3/1999 | Chu et al. |
| 5,903,553 | A | 5/1999 | Sakamoto et al. |
| 5,907,794 | A | 5/1999 | Lehmusto et al. |
| 5,963,846 | A | 10/1999 | Kurby et al. |
| 5,963,847 | A | 10/1999 | Ito et al. |
| 5,987,304 | A | 11/1999 | Latt et al. |
| 6,005,855 | A | 12/1999 | Zehavi et al. |
| 6,005,884 | A | 12/1999 | Cook et al. |
| 6,014,380 | A | 1/2000 | Hendel et al. |
| 6,032,194 | A | 2/2000 | Gai et al. |
| 6,061,548 | A | 5/2000 | Reudink et al. |
| 6,088,570 | A | 7/2000 | Komara et al. |
| 6,101,400 | A | 8/2000 | Ogaz et al. |
| 6,108,364 | A | 8/2000 | Weaver, Jr. et al. |
| 6,128,512 | A | 10/2000 | Trompower et al. |
| 6,128,729 | A | 10/2000 | Kimball et al. |
| 6,163,276 | A | 12/2000 | Irving et al. |
| 6,188,694 | B1 | 2/2001 | Fine et al. |
| 6,188,719 | B1 | 2/2001 | Collomby et al. |
| 6,195,051 | B1 | 2/2001 | McCoy et al. |
| 6,202,114 | B1 | 3/2001 | Dutt et al. |
| 6,215,982 | B1 | 4/2001 | Trompower |
| 6,219,739 | B1 | 4/2001 | Dutt et al. |
| 6,222,503 | B1 | 4/2001 | Gietema et al. |
| 6,272,351 | B1 | 8/2001 | Langston et al. |
| 6,285,863 | B1 | 9/2001 | Zhang |
| 6,298,061 | B1 | 10/2001 | Chin et al. |
| 6,304,563 | B1 | 10/2001 | Blessent et al. |
| 6,304,575 | B1 | 10/2001 | Carroll et al. |
| 6,331,792 | B1 | 12/2001 | Tonietto |
| 6,339,694 | B1 | 1/2002 | Komara et al. |
| 6,342,777 | B1 | 1/2002 | Takahashi |
| 6,363,068 | B1 | 3/2002 | Kinoshita |
| 6,370,185 | B1 | 4/2002 | Schmutz et al. |
| 6,370,369 | B1 | 4/2002 | Kraiem et al. |
| 6,377,612 | B1 | 4/2002 | Baker |
| 6,377,640 | B2 | 4/2002 | Trans |
| 6,384,765 | B1 | 5/2002 | Sjostrand et al. |
| 6,385,181 | B1 | 5/2002 | Tsutsui et al. |
| 6,388,995 | B1 | 5/2002 | Gai et al. |
| 6,393,299 | B1 | 5/2002 | Mizumoto et al. |
| 6,404,775 | B1 | 6/2002 | Leslie et al. |
| 6,441,781 | B1 | 8/2002 | Rog et al. |
| 6,473,131 | B1 | 10/2002 | Neugebauer et al. |
| 6,480,481 | B1 | 11/2002 | Park et al. |
| 6,501,955 | B1 | 12/2002 | Durrant et al. |
| 6,535,732 | B1 | 3/2003 | McIntosh et al. |
| 6,539,028 | B1 | 3/2003 | Soh et al. |
| 6,539,204 | B1 | 3/2003 | Marsh et al. |
| 6,549,542 | B1 | 4/2003 | Dong et al. |
| 6,549,567 | B1 | 4/2003 | Fullerton |
| 6,563,468 | B2 | 5/2003 | Hill et al. |
| 6,574,198 | B1 | 6/2003 | Petersson |
| 6,628,624 | B1 | 9/2003 | Mahajan et al. |
| 6,664,932 | B2 | 12/2003 | Sabet et al. |
| 6,671,502 | B1 | 12/2003 | Ogawa |
| 6,684,058 | B1 | 1/2004 | Karacaoglu et al. |
| 6,690,657 | B1 * | 2/2004 | Lau et al. ............ 370/315 |
| 6,694,125 | B2 | 2/2004 | White |
| 6,718,160 | B2 * | 4/2004 | Schmutz ............ 455/446 |
| 6,728,541 | B2 | 4/2004 | Ohkura et al. |
| 6,766,113 | B1 | 7/2004 | Al-Salameh |
| 6,781,544 | B2 | 8/2004 | Saliga et al. |
| 6,788,256 | B2 | 9/2004 | Hollister |
| 6,880,103 | B2 | 4/2005 | Kim et al. |
| 6,888,881 | B1 | 5/2005 | Nagano |
| 5,794,145 | A1 | 6/2005 | Milam |
| 6,904,266 | B1 | 6/2005 | Jin et al. |
| 6,906,669 | B2 | 6/2005 | Sabet et al. |
| 6,934,511 | B1 | 8/2005 | Lovinggood et al. |
| 6,934,555 | B2 | 8/2005 | Silva et al. |
| 6,944,139 | B1 | 9/2005 | Campanella |
| 6,957,042 | B2 | 10/2005 | Williams |
| 6,983,162 | B2 | 1/2006 | Garani et al. |
| 6,985,516 | B1 | 1/2006 | Easton et al. |
| 6,990,313 | B1 | 1/2006 | Yarkosky |
| 7,027,418 | B2 | 4/2006 | Gan et al. |
| 7,027,770 | B2 | 4/2006 | Judd et al. |
| 7,043,203 | B2 | 5/2006 | Miquel et al. |
| 7,050,442 | B1 | 5/2006 | Proctor |
| 7,050,452 | B2 | 5/2006 | Sugar et al. |
| 7,058,071 | B1 | 6/2006 | Myles et al. |
| 7,058,368 | B2 | 6/2006 | Nicholls et al. |
| 7,088,734 | B2 | 8/2006 | Newberg et al. |
| 7,103,344 | B2 | 9/2006 | Menard |
| 7,120,930 | B2 | 10/2006 | Maufer et al. |
| 7,123,670 | B2 | 10/2006 | Gilbert et al. |
| 7,123,676 | B2 | 10/2006 | Gebara et al. |
| 7,132,988 | B2 | 11/2006 | Yegin et al. |
| 7,133,391 | B2 | 11/2006 | Belcea |
| 7,133,460 | B2 | 11/2006 | Bae et al. |
| 7,139,527 | B2 | 11/2006 | Tamaki et al. |
| 7,167,526 | B2 | 1/2007 | Liang et al. |
| 7,187,904 | B2 | 3/2007 | Gainey et al. |
| 7,193,975 | B2 | 3/2007 | Tsutsumi et al. |
| 7,194,275 | B2 | 3/2007 | Bolin et al. |
| 7,200,134 | B2 | 4/2007 | Proctor, Jr. et al. |
| 7,215,964 | B2 | 5/2007 | Miyake |
| 7,233,771 | B2 | 6/2007 | Proctor, Jr. et al. |
| 7,248,645 | B2 | 7/2007 | Vialle et al. |

| | | |
|---|---|---|
| 7,254,132 B2 | 8/2007 | Takao et al. |
| 7,299,005 B1 | 11/2007 | Yarkosky et al. |
| 7,315,573 B2 | 1/2008 | Lusky et al. |
| 7,319,714 B2 | 1/2008 | Sakata et al. |
| 7,321,787 B2 | 1/2008 | Kim |
| 7,339,926 B2 | 3/2008 | Stanwood et al. |
| 7,352,696 B2 | 4/2008 | Stephens et al. |
| 7,406,060 B2 | 7/2008 | Periyalwar et al. |
| 7,409,186 B2 | 8/2008 | Van Buren et al. |
| 7,430,397 B2 | 9/2008 | Suda et al. |
| 7,450,936 B2 | 11/2008 | Kim |
| 7,457,587 B2 | 11/2008 | Chung |
| 7,486,929 B2 | 2/2009 | Van Buren et al. |
| 7,577,398 B2 | 8/2009 | Judd et al. |
| 7,590,145 B2 | 9/2009 | Futch et al. |
| 7,623,826 B2 | 11/2009 | Pergal |
| 7,676,194 B2 | 3/2010 | Rappaport |
| 7,729,669 B2 | 6/2010 | Van Buren et al. |
| 2001/0018328 A1 | 8/2001 | Ohkura et al. |
| 2001/0031646 A1 | 10/2001 | Williams |
| 2001/0040699 A1 | 11/2001 | Osawa et al. |
| 2001/0050580 A1 | 12/2001 | O'toole et al. |
| 2001/0050906 A1 | 12/2001 | Odenwalder et al. |
| 2001/0054060 A1 | 12/2001 | Fillebrown et al. |
| 2002/0004924 A1 | 1/2002 | Kim et al. |
| 2002/0018487 A1 | 2/2002 | Chen et al. |
| 2002/0034958 A1 | 3/2002 | Oberschmidt et al. |
| 2002/0045461 A1 | 4/2002 | Bongfeldt |
| 2002/0061031 A1 | 5/2002 | Sugar et al. |
| 2002/0089945 A1 | 7/2002 | Belcea |
| 2002/0101843 A1 | 8/2002 | Sheng et al. |
| 2002/0102948 A1 | 8/2002 | Stanwood et al. |
| 2002/0109585 A1 | 8/2002 | Sanderson |
| 2002/0115409 A1 | 8/2002 | Khayrallah |
| 2002/0119783 A1 | 8/2002 | Bourlas et al. |
| 2002/0136268 A1 | 9/2002 | Gan et al. |
| 2002/0141435 A1 | 10/2002 | Newberg et al. |
| 2002/0159506 A1 | 10/2002 | Alamouti et al. |
| 2002/0163902 A1 | 11/2002 | Takao et al. |
| 2002/0177401 A1 | 11/2002 | Judd et al. |
| 2003/0026363 A1 | 2/2003 | Stoter et al. |
| 2003/0063583 A1 | 4/2003 | Padovani et al. |
| 2003/0139175 A1 | 7/2003 | Kim |
| 2003/0179734 A1 | 9/2003 | Tsutsumi et al. |
| 2003/0185163 A1 | 10/2003 | Bertonis et al. |
| 2003/0211828 A1 | 11/2003 | Dalgleish et al. |
| 2003/0235170 A1 | 12/2003 | Trainin |
| 2003/0236069 A1 | 12/2003 | Sakata et al. |
| 2004/0029537 A1 | 2/2004 | Pugel et al. |
| 2004/0038707 A1 | 2/2004 | Kim |
| 2004/0047333 A1 | 3/2004 | Han et al. |
| 2004/0047335 A1 | 3/2004 | Proctor, Jr. et al. |
| 2004/0110469 A1 | 6/2004 | Judd et al. |
| 2004/0131025 A1 | 7/2004 | Dohler et al. |
| 2004/0146013 A1 | 7/2004 | Song et al. |
| 2004/0157551 A1 | 8/2004 | Gainey et al. |
| 2004/0166802 A1 | 8/2004 | McKay, Sr. et al. |
| 2004/0176050 A1 | 9/2004 | Steer et al. |
| 2004/0198295 A1 | 10/2004 | Nicholls et al. |
| 2004/0208258 A1 | 10/2004 | Lozano et al. |
| 2004/0218683 A1 | 11/2004 | Batra et al. |
| 2004/0229563 A1 | 11/2004 | Fitton et al. |
| 2004/0235417 A1 | 11/2004 | Dean |
| 2004/0248581 A1 | 12/2004 | Seki et al. |
| 2004/0264511 A1 | 12/2004 | Futch et al. |
| 2005/0014464 A1 | 1/2005 | Larsson |
| 2005/0030891 A1 | 2/2005 | Stephens et al. |
| 2005/0042999 A1 | 2/2005 | Rappaport |
| 2005/0130587 A1 | 6/2005 | Suda et al. |
| 2005/0190822 A1 | 9/2005 | Fujii et al. |
| 2005/0201315 A1 | 9/2005 | Lakkis |
| 2005/0254442 A1 | 11/2005 | Proctor, Jr. et al. |
| 2005/0256963 A1 | 11/2005 | Proctor, Jr. et al. |
| 2005/0286448 A1 | 12/2005 | Proctor et al. |
| 2006/0028388 A1 | 2/2006 | Schantz |
| 2006/0035643 A1 | 2/2006 | Vook et al. |
| 2006/0052066 A1 | 3/2006 | Cleveland et al. |
| 2006/0052099 A1 | 3/2006 | Parker |
| 2006/0056352 A1 | 3/2006 | Proctor et al. |
| 2006/0063484 A1 | 3/2006 | Proctor et al. |
| 2006/0063485 A1 | 3/2006 | Gainey et al. |
| 2006/0098592 A1 | 5/2006 | Proctor, Jr. et al. |
| 2006/0183421 A1 | 8/2006 | Proctor et al. |
| 2006/0203757 A1 | 9/2006 | Young et al. |
| 2006/0262026 A1 | 11/2006 | Gainey et al. |
| 2007/0025349 A1 | 2/2007 | Bajic |
| 2007/0025486 A1 | 2/2007 | Gainey et al. |
| 2007/0032192 A1 | 2/2007 | Gainey et al. |
| 2007/0121546 A1 | 5/2007 | Zuckerman et al. |
| 2007/0286110 A1 | 12/2007 | Proctor, Jr. et al. |
| 2008/0057862 A1 | 3/2008 | Smith |
| 2008/0233942 A9 | 9/2008 | Kim |

FOREIGN PATENT DOCUMENTS

| | | |
|---|---|---|
| EP | 0523687 A2 | 1/1993 |
| EP | 0709973 A1 | 5/1996 |
| EP | 0715423 | 6/1996 |
| EP | 0847146 A2 | 6/1998 |
| EP | 0853393 A1 | 7/1998 |
| EP | 0860953 A1 | 8/1998 |
| GB | 2272599 A | 5/1994 |
| GB | 2351420 A | 12/2000 |
| JP | 62040895 | 2/1987 |
| JP | 63160442 | 7/1988 |
| JP | 64011428 | 1/1989 |
| JP | 02100358 | 4/1990 |
| JP | 03021884 | 1/1991 |
| JP | 05063623 | 3/1993 |
| JP | 05102907 | 4/1993 |
| JP | 06013947 | 1/1994 |
| JP | 06334577 | 12/1994 |
| JP | 07030473 | 1/1995 |
| JP | 7079187 A | 3/1995 |
| JP | 07079205 | 3/1995 |
| JP | 07131401 | 5/1995 |
| JP | 8097762 A | 4/1996 |
| JP | 08274706 | 10/1996 |
| JP | 09018484 A | 1/1997 |
| JP | 09130322 | 5/1997 |
| JP | 09162801 | 6/1997 |
| JP | 9162903 A | 6/1997 |
| JP | 09182155 | 7/1997 |
| JP | 09214418 | 8/1997 |
| JP | 10032557 A | 2/1998 |
| JP | 10107727 | 4/1998 |
| JP | 10135892 | 5/1998 |
| JP | 11055713 | 2/1999 |
| JP | 11127104 | 5/1999 |
| JP | 11298421 | 10/1999 |
| JP | 2000031877 | 1/2000 |
| JP | 2000502218 T | 2/2000 |
| JP | 2000082983 A | 3/2000 |
| JP | 2000236290 | 8/2000 |
| JP | 2000269873 | 9/2000 |
| JP | 2001016152 | 1/2001 |
| JP | 2001111575 A | 4/2001 |
| JP | 2001136115 | 5/2001 |
| JP | 2001244864 A | 9/2001 |
| JP | 2002033691 | 1/2002 |
| JP | 2002111571 A | 4/2002 |
| JP | 2002271255 | 9/2002 |
| JP | 2003174394 | 6/2003 |
| JP | 2003198442 | 7/2003 |
| JP | 2003244050 | 8/2003 |
| JP | 2004056210 | 2/2004 |
| JP | 2004328666 | 11/2004 |
| JP | 2005072646 | 3/2005 |
| JP | 2005110150 | 4/2005 |
| JP | 2005236626 | 9/2005 |
| JP | 2005531265 | 10/2005 |
| JP | 2006503481 | 1/2006 |
| JP | 2006505146 | 2/2006 |
| KR | 100610929 | 8/2006 |
| RU | 2120702 C1 | 10/1998 |
| WO | WO92/14339 | 8/1992 |
| WO | WO97/15991 | 5/1997 |
| WO | WO97/34434 | 9/1997 |
| WO | WO98/58461 A1 | 12/1998 |

| | | |
|---|---|---|
| WO | WO99/59264 A2 | 11/1999 |
| WO | WO00/50971 A2 | 8/2000 |
| WO | WO01/52447 | 7/2001 |
| WO | WO01/82512 A1 | 11/2001 |
| WO | WO01/99308 | 12/2001 |
| WO | WO02/08857 A2 | 1/2002 |
| WO | WO02/17572 A2 | 2/2002 |
| WO | WO03/013005 A2 | 2/2003 |
| WO | WO04/002014 A1 | 12/2003 |
| WO | WO2004/001892 | 12/2003 |
| WO | WO2004/001986 A2 | 12/2003 |
| WO | WO2004/002014 | 12/2003 |
| WO | WO2004004365 | 1/2004 |
| WO | WO2004/032362 | 4/2004 |
| WO | WO2004/036789 | 4/2004 |
| WO | WO2004/038958 | 5/2004 |
| WO | WO2004/062305 A1 | 7/2004 |
| WO | WO2005/115022 | 12/2005 |

OTHER PUBLICATIONS

Office Action issued from the Patent Office of People's Republic of China dated Jan. 4, 2008 in corresponding Chinese Patent Application No. 200380101286.2 (with English translation).

Andrisano, et al., On the Spectral Efficiency of CPM Systems over Real Channel in the Presence of Adjacent Channel and CoChannel Interference: A Comparison between partial and Full Response Systems, IEEE Transactions on Vehicular Technology, vol. 39, No. 2, May 1990.

Code of Federal Regulations, Title 47 Telecommunication; "Federal Communications Commission code part 15.407," Federal Communications Commission vol.1, chapter I, part 15.407.

Draft Corrigendum to IEEE Standard for Local and Metropolitan Area Networks-Part 16: Air Interface for Fixed Broadband Wireless Access Systems, IEEE P802. 16-2004/Cor1/D5.

Draft IEEE Standard for Local and Metropolitan Area Networks-Part 16: Air Interface for Fixed and Mobile Broadband Wireless Access Systems; Amendment for Physical and Medium Access Control Layers for Combined Fixed and Mobile Operation in Licensed Bands. IEEE 802.16(e), Part 16: Air Interface for Fixed Broadband Wireless Access Systems, 2005, Sections 8.4.10.2.1; 8.4.10.3.2.

IEEE Std 802.11-1999 (Reaff 2003), "Part 11: Wireless LAN Medium Access Control (MAC) and Physical Layer (PHY) Specifications, " LAN MAN Standards Committee of the IEEE Computer Society; Paragraphs 7.2.3.1 and 7.2.3.9; Paragraph 7.3.2.4; Paragraphs 15.4.6.2 and 18.4.6.2.

IEEE Std 802.11b-1999, "Part 11:Wireless LAN Medium Access Control (MAC) and Physical Layer (PHY) specifications: Higher-Speed Physical Layer Extension in the 2.4 GHz Band," IEEE-SA Standards Board, Supplement to ANSI/IEEE Std. 802.11, 1999 Edition, Approved Sep. 16, 1999.

IEEE Std 802. 11g-2003, "Part 11: Wireless LAN Medium Access Control (MAC) and Physical Layer (PHY) specifications: Amendment 4: Further Higher Data Rate Extension in the 2.4 GHz Band," IEEE Computer Society, Published by The Institute of Electrical and Electronics Engineers, Inc., Jun. 27, 2003.

IEEE Std 802.16-2001; "Part 16: Air Interface for Fixed Broadband Wireless Access Systems," IEEE Computer Society and the IEEE Microwave Theory and Techniques Society, Published by The Institute of Electrical and Electronics Engineers, Inc., Apr. 8, 2002.

International Search Report-PCT/US03/029117, International Search Authority-US, Feb. 13, 2004.

Kannangara, et al., "Analysis of an Adaptive Wideband Duplexer with Double-Loop Cancellation," IEEE Transactions on Vehicular Technology, vol. 56, No. 4, Jul. 2007, pp. 1971-1982.

Kutlu. et al., "Performance Analysis of MAC Protocols for Wireless Control Area Network," 1996 IEEE, pp. 494-499.

Specifications for2.3 GHz Band Portable Internet Service-Physical & Medium Access Control Layer, TTAS.KO-06,0082/R1, Dec. 2005.

First Office Action issued from the Chinese Patent Office in connection with corresponding Chinese application No. 200380101286.2 (Jan. 19, 2007).

Draft IEEE Standard for Local and Metropolitan Area Networks-Part 16: Air Interface for Fixed and Mobile Broadband Wireless Access Systems; Amendment for Physical and Medium Access Control Layers for Combined Fixed and Mobile Operation in Licensed Bands. IEEE P802.16E/D12, Oct. 2005.

First Report issued by IP Australia on Jul. 31, 2007 in connection with the corresponding Australian application No. 2003239577.

Mexican Office communication dated Jul. 2, 2007 issued from Mexican Patent Office for application PA/a/2004/011588 with partial translation thereof.

Notification of the First Office Action from Chinese Patent Office dates Sep. 8, 2006 for the corresponding Chinese patent application No. 200380105267.7.

Office Action English translation dated Jul. 4, 2008 issued from Chinese Patent Office for Application No. 03814391.7.

Office Action English translation dated Jun. 29, 2009 issued from Japanese Patent Office for Application No. 2004-541532.

Office communication dated Jan. 12, 2007 issued from the European Patent Office for counterpart application No. 03734139.9-1246.

Official communication issued from the European Patent Office dated Aug. 7, 2007 for the corresponding European patent application No. 03759271.4-2412.

Official communication issued from the European Patent Office dated Dec. 19, 2006 for the corresponding European patent application No. 03759271.4-2412.

Second Office Action issued from the Chinese Patent Office on Jul. 20, 2007 in connection with corresponding Chinese application No. 200380101286.2.

Third Office Action issued from the Patent Office of People's Republic of China dated Jan. 4, 2008 in corresponding Chinese Patent Application No. 200380101286.2.

Translation of Office Action in Japanese application 2004-515701, corresponding to U.S. Appl. No. 10/516,327, citing WO00050971, JP2000-031877, JP2002-033691, JP2002-111571 and JP11-127104. Dated May 25, 2010.

Translation of Office Action in Japanese application 2004-544751, corresponding to U.S. Appl. No. 10/531,078, citing WO00050971, JP2002-111571, JP05-102907, JP63-160442, JP2000-502218, JP10-032557 and JP2000-082983. Dated Aug. 25, 2009.

Translation of Office Action in Japanese application 2004-5535510, corresponding to U.S. Appl. No. 10/533,589, citing WO00050971, JP09-182155, JP64-011428 and JP62-040895. Dated Sep. 29, 2009.

Translation of Office Action in Japanese application 2004-565505, corresponding to U.S. Appl. No. 10/563,471, citing JP08-097762 and JP2001-111575. Dated Aug. 11, 2009.

Translation of Office Action in Japanese application 2004-565505, corresponding to U.S. Appl. No. 10/563,471, citing JP08-097762, JP2001-111575, JP09-018484 and JP11-055713. Dated Sep. 14, 2010.

Translation of Office Action in Japanese application 2004-565505, corresponding to U.S. Appl. No. 10/563,471, citing JP09-018484. Dated Feb. 23, 2010.

Translation of Office Action in Korean application 2008-7026775, corresponding to U.S. Appl. No. 11/730,361, citing KR100610929 Dated Aug. 30, 2010.

Translation of Office Action issued by Chinese Patent Office on Oct. 19, 2007 in connection with the corresponding Chinese application No. 03814391,7.

Translation of Office Action in Japanese application 2007-513349 corresponding to U.S. Appl. No. 11/546,242, citing WO04032362, WO2004001986, JP09214418, JP07131401, JP2004056210, JP2000082983, JP09130322, JP2003244050, JP2003198442, US6377612, JP2006503481, JP2002111571, JP09162801, JP2005531202, WO2004001892 and JP10107727 dated Nov. 16, 2010.

Translation of Office Action in Japanese application 2009-503041, corresponding to U.S. Appl. No. 11/730,361, citing WO05115022, JP10-135892, JP2005-531265, 2006-503481, JP2005-531202 and JP2006-505146. Dated Oct. 26, 2010.

Translation of Office Action in Japanese application 2009-526736 corresponding to U.S. Appl. No. 12/307,801, citing US20040110469, US20060019603, JP2005072646, JP2001016152, JP11298421, JP2001136115, JP2005110150, JP2005236626, WO9715991 and WO0199308 dated Jan. 4, 2011.
Translation of Office Action in Korean application 2009-7010639, corresponding to U.S. Appl. No. 12/439,018, citing WO01052447 and US2004/0208258, Dated Nov. 15, 2010.

Office Action issued from the Chinese Patent Office in connection with corresponding Chinese application No. 200380101286.2, Jan. 2007.

* cited by examiner

REDUCING LOOP EFFECTS IN A WIRELESS LOCAL AREA NETWORK REPEATER

CROSS-REFERENCE TO RELATED APPLICATIONS

This application is related to PCT Application PCT/US03/16208 entitled REPEATER FOR WLAN, and is further related to and claims priority from U.S. provisional Application Ser. No. 60/417,672, filed on Oct. 11, 2002 both of which applications are incorporated herein by reference.

FIELD OF THE INVENTION

The present invention relates generally to wireless local area networks (WLANs) and more specifically to reducing the likelihood of frequency contention and erroneous connection loops within a transmission environment with two or more WLAN repeaters.

BACKGROUND OF THE INVENTION

Several standard protocols for wireless local area networks, commonly referred to as WLANs, are becoming popular. These include protocols such as 802.11 (as set forth in the 802.11 wireless standards), home RF, and Bluetooth. The standard wireless protocol with the most commercial success to date is the 802.11b protocol although successors such as next generation protocols, such as 802.11g, are also gaining popularity.

While the specifications of products utilizing the above standard wireless protocols commonly indicate data rates on the order of, for example, 11 MBPS and ranges on the order of, for example, 100 meters, these performance levels are rarely, if ever, realized. Performance shortcomings between actual and specified performance levels have many causes including attenuation of the radiation paths of RF signals, which are typically in the range of 2.4 GHz in an operating environment such as an indoor environment. Base to receiver ranges are generally less than the coverage range required in a typical home, and may be as little as 10 to 15 meters. Further, in structures having split floor plans, such as ranch style or two story homes, or those constructed of materials capable of attenuating RF signals, areas in which wireless coverage is needed may be physically separated by distances outside of the range of, for example, an 802.11 protocol based system. Attenuation problems may be exacerbated in the presence of interference in the operating band, such as interference from other 2.4 GHz devices or wideband interference with in-band energy. Still further, data rates of devices operating using the above standard wireless protocols are dependent on signal strength. As distances in the area of coverage increase, wireless system performance typically decreases. Lastly, the structure of the protocols themselves may affect the operational range.

Repeaters are commonly used in the mobile wireless industry to increase the range of wireless systems. However, problems and complications arise in that system receivers and transmitters may operate at the same frequency in a WLAN utilizing, for example, 802.11 or 802.16 WLAN wireless protocol. In such systems, when multiple transmitters operate simultaneously, as would be the case in repeater operation, difficulties arise. Typical WLAN protocols provide no defined receive and transmit periods and, thus, because random packets from each wireless network node are spontaneously generated and transmitted and are not temporally predictable, packet collisions may occur. Some remedies exist to address such difficulties, such as, for example, collision avoidance and random back-off protocols, which are used to avoid two or more nodes transmitting packets at the same time. Under 802.11 standard protocol, for example, a distributed coordination function (DCF) may be used for collision avoidance.

Such operation is significantly different than the operation of many other cellular repeater systems, such as those systems based on IS-136, IS-95 or IS-2000 standards, where the receive and transmit bands are separated by a deplexing frequency offset. Frequency division duplexing or multiplexing (FDD or FDM) operation simplifies repeater operation since conflicts associated with repeater operation, such as those arising in situations where the receiver and transmitter channels are on the same frequency, are not present.

Other cellular mobile systems separate receive and transmit channels by time rather than by frequency and further utilize scheduled times for specific uplink/downlink transmissions. Such operation is commonly referred to as time division duplexing or multiplexing, such as TDD or TDM. Repeaters for these systems are easily built, as the transmission and reception times are well known and are broadcast by a base station. Receivers and transmitters for these systems may be isolated by any number of means including physical separation, antenna patterns, or polarization isolation.

Thus, WLAN repeaters operating on the same frequencies without TDD or TDM capability have unique constraints due to the above spontaneous transmission capabilities and therefore require a unique solution. Since these repeaters use the same frequency for receive and transmit channels, some form of isolation must exist between the receive and transmit channels of the repeater. While some related systems such as, for example, CDMA systems used in wireless telephony, achieve channel isolation using sophisticated techniques such as directional antennas, physical separation of the receive and transmit antennas, or the like, such techniques are not practical for WLAN repeaters in many operating environments such as in the home where complicated hardware or lengthy cabling is not desirable or may be too costly.

One system, described in International Application No. PCT/US03/16208 and commonly owned by the assignee of the present application, resolves many of the above identified problems by providing a repeater which isolates receive and transmit channels using a frequency detection and translation method. The WLAN repeater described therein allows two WLAN units to communicate by translating packets associated with one device at a first frequency channel to a second frequency channel used by a second device. The direction associated with the translation or conversion, such as from the frequency associated with the first channel to the frequency associated with the second channel, or from the second channel to the first channel, depends upon a real time configuration of the repeater and the WLAN environment. The WLAN repeater may be configured to monitor both channels for transmissions and, when a transmission is detected, translate the received signal at the first frequency to the other channel, where it is transmitted at the second frequency.

The above described approach solves both the isolation issue and the spontaneous transmission problems as described above by monitoring and translating in response to packet transmissions and may further be implemented in a small inexpensive unit. The base concept of the above described approach is generally suited to scenarios where a single repeater is used for example between an Access Point (AP) and a mobile communication unit or station.

However, in multiple repeater environments where, for example, two or more repeaters are used within the same WLAN environment, undesirable interaction such as jamming or feedback may occur between two repeaters. Potential causes include operating two or more repeaters on the same frequencies where the repeaters are providing repeater servicing for clients from the same AP. Such a conflict may exist, for example, where a client device/station (STA) can only be heard by a single repeater transmitting on a first frequency (F1), and the repeater transmits to the AP on a second frequency (F2). Another repeater may also transmit on F1 thus interfering with station transmissions also at F1.

A second example of undesirable interaction may occur when repeaters are chained together in a straight line order, such as AP-R1-R2-STA. In such an exemplary scenario, an AP may transmit, for example, on F1, repeater R1 transmits on F2, and repeater R2 will transmit on F1 again to STA. Problems may arise due to feedback or jamming caused by transmission loop-back arising from a node, for example, an AP or STA, hidden or lower in receive power than the signal from an adjacent repeater, while repeaters R1 and R2 operate on the same pair of channels. Thus for example, if R2 receives a signal transmitted by R1, and re-transmits on the same frequency used by R1 to receive causing either a reduction in signal quality or a constructive feedback situation where each repeater progressively amplifies the signal ultimately resulting in an oscillation.

SUMMARY OF THE INVENTION

Thus a method and apparatus for handling the above described problems in a wireless local area network (WLAN) are described, wherein in accordance with one exemplary embodiment, the WLAN includes a base unit connected to a wide area network. The base unit communicates with at least one client unit using a protocol requiring the base unit and the at least one client unit to receive and transmit information on a same frequency channel chosen from at least two available frequency channels, such as in accordance with an 802.11, or the like protocol. The base unit preferably identifies which of multiple operating frequencies is chosen in a control parameter transmitted in a protocol message associated with the protocol.

In accordance with various exemplary embodiments, the present invention includes a series of techniques for solving or at least reducing problems associated with WLAN interference previously described herein above. Such techniques preferably include for example, passive monitoring, rule based channel selection, active monitoring, and feedback detection and suppression via gain control. It will be appreciated that the techniques described herein may be used individually or together without departing from the scope of the invention. Moreover, in accordance with various preferred exemplary embodiments, the above described techniques may be prioritized such that, for example, passive monitoring is first performed, then rule based channel selection, then active monitoring, and then gain control, or another suitable order of priority.

Thus, to avoid the repeater interactions described above, it is desirable to configure each repeater within range of another repeater on different repeating channels. To best accomplish such configuration and reconfiguration, for example, in accordance with an exemplary passive monitoring approach, active channels are preferably monitored and configured such that only one of a contending WLAN frequency channel, such as a single channel used or re-used by different repeaters or other WLAN nodes within range of each other, has activity on it. Accordingly, no two repeaters within the passive monitoring area are likely to be configured to use the same channel or set of channels. Further, exemplary passive monitoring processes may be made more efficient by defining rules for scanning and selecting channels to monitor based on any number of diverse criteria, heuristics or the like, ensuring a high degree of probability that channel pairs will be sufficiently isolated to prevent degradation in transmission quality based on various metrics associated with the repeaters, communication units or stations, APs and other network nodes, elements, and the like as would be appreciated by one of ordinary skill in the art.

In accordance with another exemplary embodiment, an active monitoring approach may be used as safeguard against repeater or node interaction. In active monitoring, after channels have been "pre-selected", an exemplary repeater may transmit a signal, such as a test signal, on a repeater channel where no apparent activity is present. The AP channel or other channel of interest, such as a proximate channel where there would be a likelihood of a false connection loop, would then be monitored for activity corresponding to the transmission to determine whether returned transmissions are present from, for example, a false connection loop, which may be likely to cause system level issues. An exemplary repeater in accordance with an active monitoring approach preferably continues to monitor the AP channel and the repeater channel for a clear channel assessment and a determination that WLAN rules are being complied with prior to transmission on the repeated channel to prevent any collision of signals on the AP channel, repeater channel, channel of interest or the like. It should be noted that the signal generated by the repeater to accomplish exemplary active monitoring methods may be any signal compliant with part 15.247 or part 15.407 of F.C.C. rules, or the rules of the WLAN system the repeater is operating within, including, for example, a spread spectrum or frequency hopped signal, and may even include pulses, impulses, wide band signals, or the like including generic broad band or band limited noise. It will be appreciated that one benefit of using such signals may include being better able to characterize the WLAN communication environment and the interference potential of adjacent nodes within the repeater environment described in connection with the present invention.

In accordance with yet another exemplary embodiment, feedback detection and suppression are used with attendant advantages in situations where no unused or empty channels are available, and where other repeaters may be active on the paired channels. Such a scenario is likely, for example, in an 802.11b protocol environment operating in the 2.4 GHz band where only 3 channels are available. Typically, channels 1 and 3 are always reserved due to protocol implementation and related concerns. Thus, feedback or oscillation detection is preferably performed for other channels in one or more of the following ways: changing the transmit gain on a channel and determining whether transmit power is correspondingly modified, examining timing parameters of the signal waveform on a channel, or by detecting a maximum power output beyond a set value, or the like. The detected feedback condition may be suppressed by reducing, for example, the transmit gain significantly to where the transmit power does drop. Stability may be ensured by removing a portion of additional gain margin at the point where transmit power drops.

It should be noted that the effect of repeating feedback on signal integrity is minimal. With delay in the repeater on the order of less than 1 microsecond ($\mu$s), there will be an exponentially decaying multi-path effect generally as follows: first path 0 dB, second path −10 dB, third path −20 dB, and so on. The delays associated with typical decay are sufficiently small such that a significant portion of signal energy remains within the range of the equalizer in the receiver or within the parameters of, for example, 802.11a protocol, and thus will not cause significant performance degradation.

DETAILED DESCRIPTION OF THE INVENTION

Figure 1:
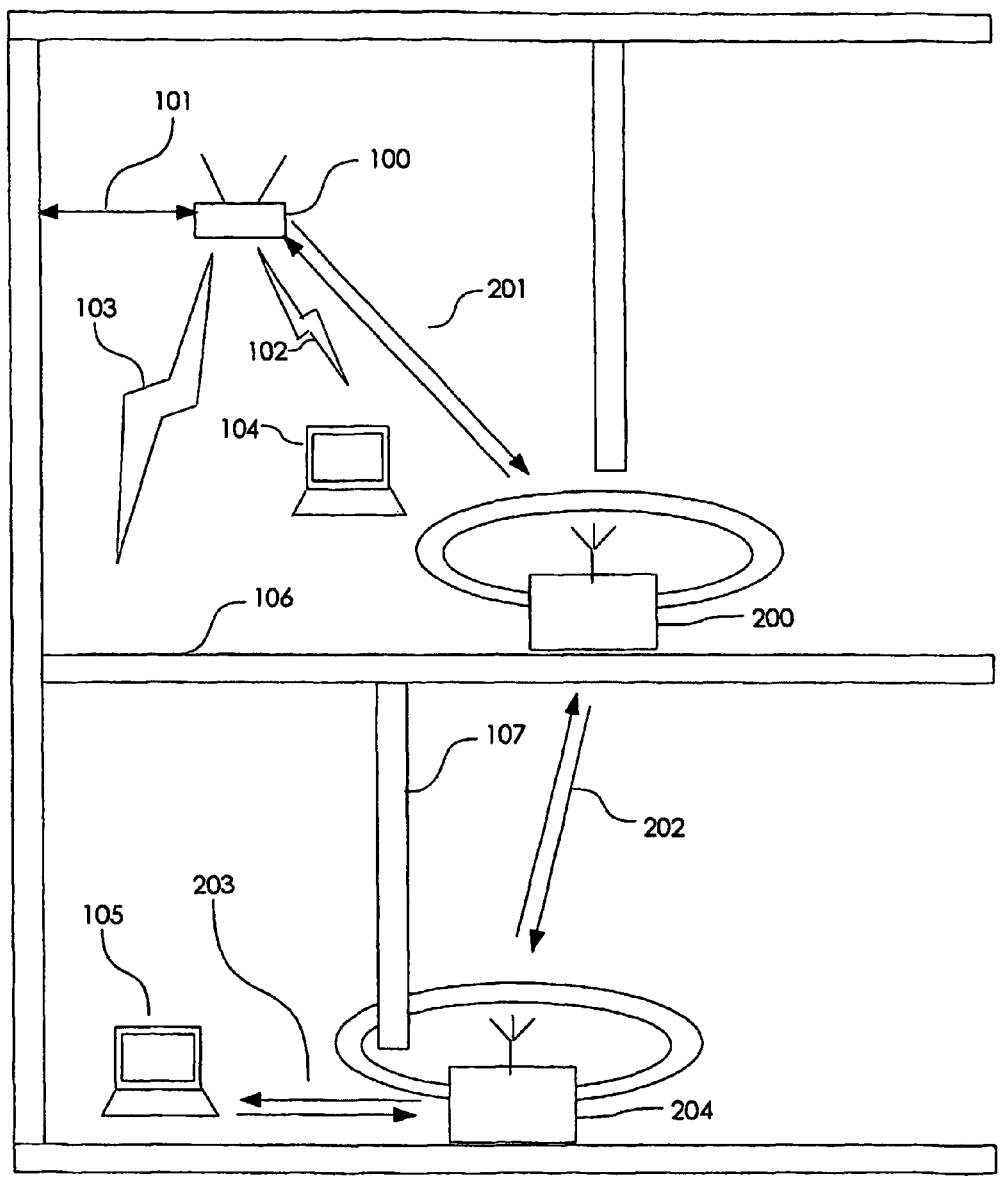
FIG. 1 is a block diagram illustrating a wireless network environment including two exemplary repeaters.

Referring now to FIG. 1, a wide area connection 101, which could be, for example, an Ethernet connection, a T1 line, a wideband wireless connection or any other electrical connection providing a data communications path, may be connected to a wireless gateway, or access point (AP) 100. The wireless gateway 100 sends RF signals, such as IEEE 802.11 packets or signals based upon Bluetooth, Hyperlan, or other wireless communication protocols, to client units 104, 105, which may be personal computers, personal digital assistants, or any other devices capable of communicating with other like devices through one of the above mentioned wireless protocols. Respective propagation, or RF, paths to each of the client units 104, 105 are shown as 102, 103.

While the signal carried over RF path 102 is of sufficient strength to maintain high-speed data packet communications between the client unit 104 and the wireless gateway 100, the signals carried over the RF path 103 and intended for the client unit 105 would be attenuated when passing through a structural barrier such as walls 106 or 107 to a point where few, if any, data packets are received in either direction if not for wireless repeaters 200, 204 the structure and operation of which will now be described.

To enhance the coverage and/or communication data rate to the client unit 105, wireless repeaters 200, 204 receive packets transmitted on a first frequency channel 201 from the wireless gateway 100. The wireless repeater 200, which may be housed in an enclosure typically having dimensions of, for example, 2.5"×3.5"×0.5", and which preferably is capable of being plugged into a standard electrical outlet and operating on 110 V AC power, detects the presence of a packet on the first frequency channel 201, receives the packet and re-transmits the packet with more power on a second frequency channel 202. Unlike conventional WLAN operating protocols, the client unit 105 operates on the second frequency channel, even though the wireless gateway 100 operates on the first frequency channel. To perform the return packet operation, the wireless repeater 200 detects the presence of a transmitted packet on the second frequency channel 202 from the client unit 105, receives the packet on the second frequency channel 202, and re-transmits the packet on the first frequency channel 201. The wireless gateway 100 then receives the packet on the first frequency channel 201. In this way, the wireless repeater 200 is capable of simultaneously receiving and transmitting signals as well as extending the coverage and performance of the wireless gateway 100 to the client unit 105.

It should also be appreciated that wireless repeater 200 may be used to enhance communications in a peer-to-peer network from one client unit to another client unit. In a scenario where many units are isolated from one another, wireless repeater 200 preferably acts as a wireless hub allowing two different groups of units to communicate in such an isolated environment where communication in accordance with standard RF propagation and coverage rules would otherwise be inhibited.

However, as described herein above, repeater systems using frequency translation may encounter problems, for example, when beacon signals are used. In accordance therefore with the present invention, range extension may be realized in such systems using repeaters for wireless local area networks and may be particularly advantageous when specific protocols are used, such as, for example, the 802.11 series of protocols by modifying the beacon signal to reflect the frequency translation. As noted however problems arise when adjacent nodes using or re-using translated frequencies within range of each other may establish false connections which lead to problems from node to node in terms of data traffic integrity. False connections may also lead to repeater to repeater oscillations when both repeaters are using the same frequency pairs and may further lead to system problems causing a general failure in the WLAN environment.

Referring again to FIG. 1, as described herein above, wide area connection 101 is preferably connected to a wireless gateway or access point (AP) 100. AP 100 communicates by transmitting and receiving, for example, data packets to wide area connection 101 on one side and sends RF signals 102 and 103, to client units 104 and 105. In accordance with a preferred embodiment, RF signals 102 and 103 preferably carry, for example, IEEE 802.11 packets. In accordance with alternative exemplary embodiments, RF signals 102 and 103 could also be associated with Bluetooth, Hyperlan, 802.16, 802.20, TDS-CDMA, or the like wireless communication protocols. Two propagation paths to each of the client units are further shown associated with RF signals 102 and 103. It should be noted that while the signal strength resulting from the path associated with RF signal 102 is sufficient to maintain high speed data packet communications with client unit 104, the signal strength resulting from the path associated with RF signal 103 however is attenuated, such as from obstacle 106 which may be a wall or other obstruction, to a level where few or no data packets are able to be received in either direction between, for example, AP 100 and client unit 105.

To address the difficulties posed by obstructions as described above and attendant attenuation of the signal strength along obstructed paths and thus to enhance the coverage and/or communication data rate to client unit 105, exemplary wireless repeater 200, as shown in FIG. 1, may be used to retransmit packets beyond a range limited by propagation path constraints through, for example, frequency translation. Packets transmitted on a first frequency channel 201 from AP 100 are received at repeater 200 and re-transmitted, preferably with a greater power level, on a second frequency channel 202. Client unit 105 preferably operates on second frequency channel 202 as if AP 100 were also operating on it, such as with no knowledge that AP 100 is really operating on first frequency channel 201 such that the frequency translation is transparent. To perform return packet operations, repeater unit 200 detects the presence of a transmitted return packet on second frequency channel 202 from client unit 105, and is preferably configured to receive the packet on second frequency channel 202, and to retransmit the data packet to, for example AP 100, on first frequency channel 201.

Repeater 200 may thus receive and transmit packets at the same time on different frequency channels thereby extending the coverage and performance of the connection between AP 100 and client unit 105, and between peer-to-peer connections such as from one client unit to another client unit. When many units are isolated from one another, repeater unit 200 further acts as a wireless bridge allowing two different groups of units to communicate where optimum RF propagation and coverage or, in many cases, any RF propagation and coverage was not previously possible.

Wireless repeater 200 is preferably capable of receiving two different frequencies simultaneously, such as first frequency channel 201 and second frequency channel 202 determining which channel is carrying a signal associated with, for example, the transmission of a packet, translating from the original frequency channel to an alternative frequency channel and retransmitting the frequency translated version of the received signal on the alternative channel. Details of internal repeater operation may be found in co-pending PCT Application No. PCT/US03/16208.

Referring still to FIG. 1, and in accordance with one preferred exemplary embodiment of an 802.11 system, a beacon message transmitted from AP 100 to another device has a specific field, such as the channel number field of a direct sequence (DS) parameter set. However the channel number identified in the beacon transmitted from AP 100, for example, to repeater 200, does not correspond to the actual channel number used between AP 100 and repeater 200, such as channel 201.

Rather, in accordance with various exemplary and preferred exemplary embodiments, the channel of operation identified in the beacon from AP 100 is the channel to be used after frequency translation occurs in repeater 200, which will be referred to hereinafter as frequency translating repeater 200. Repeater 200 may further be capable of receiving a beacon from AP 100, modifying the contents of the beacon with the correct channel number in the DS parameter set segment of the beacon and retransmitting the modified beacon. It should be noted that such operation allows use of 802.11 protocols with no modifications to APs, client devices, or other nodes since the "spoofed" parameter is handled by nodes in a normal fashion. The original beacon transmitted from AP 100 containing the incorrect channel number will be ignored by client devices after being directed to the new translated channel number contained in the beacon having the spoofed DS parameter. It should be apparent to one of ordinary skill in the art how to transmit the signals on the frequencies described herein according to the protocols set forth, and, further, the DS parameter may be reset easily by modifying its channel set value, in accordance with for example, IEEE 802.11, Paragraph 7.3.2.4 "DS Parameter Set Element".

Thus frequency translating repeater 200 converts the 802.11b modulated packet from a first frequency channel to a second frequency channel, where it may be received by one or more clients, such as station devices (STA) or client units 104 or 105. Client units 104 or 105 preferably receive a beacon identifying an 802.11b channel as being the appropriate channel for communication, and would receive information packets translated by the repeater 200 from a first channel to a second channel. It will be appreciated by one of ordinary skill in the art that an exemplary frequency translating repeater in accordance with various exemplary and alternative exemplary embodiments may translate between any 2 channels, such as from an 802.11a channel to another 802.11a channel, 802.11a channel to an 802.11b channel, 802.11b channel to an 802.11a channel, 802.11b channel to another 802.11b channel, and so on. It is further contemplated that an 802.11g channel or a channel associated with any suitable wireless protocol may also be used in accordance with frequency translation, without departing from the invention.

On the return signal path, station client unit 105 may transmit the standard compliant 802.11b signal in the appropriate frequency band, such as defined in the standard, and repeater 200 detects the 802.11b signal and translates packets carried thereon to frequency channels defined in the 802.11a standard, but not conforming to the 802.11a OFDM modulation. AP 100 may receive the 802.11b modulated waveform in the frequency channels defined for 802.11a signals, and will process the waveform it as if it were in a 802.11b frequency channel.

It will be appreciated that in order to perform frequency translation to channels in different bands, a multi-band capability is preferably present in one or more of an exemplary AP, frequency translating repeater, client station or the like node of an exemplary WLAN. Such a multi-band capability preferably allows, for example, both 2.4 GHz and 5 GHz waveforms to be generated and transmitted and detected and received through the use of appropriate hardware such as antennae, power control circuits, transceivers, and control software within the same device or node.

In accordance with various exemplary and alternative exemplary embodiments, AP 100 may use an IEEE 802.11b or IEEE 802.11g modulation compliant waveform, but transmits signals on a non standard-conforming band, such as on a different band from one defined as appropriate by the IEEE 802.11a standard. A frequency translating repeater 200, 204 may thus converts an exemplary IEEE 802.11b or IEEE 802.11g modulated packet from the "a" band on one channel to the "b" band on another channel where it is utilized by a station device such as client unit 105. When signals return from a station, such as client unit 104 or 105 to AP 100, client units 104 or 105 may preferably transmit the standard 802.11b compliant signal in the appropriate band, such as defined in the standard, repeater 200 detects the 802.11b signal and translates it in accordance with frequency channels defined in the 802.11a standard, but in conflict with, for example, the channel of operation, if present, in the DS parameter set message.

It should be noted that in accordance with various exemplary and alternative exemplary embodiments, for example as illustrated in FIG. 1, a "Backhaul" channel may refer to the channel with the incorrect DS Parameter set message and a translating repeater may be referred to as "off-ramp" repeater 204. FIG. 1 further shows "hi-way" repeater 200 and "off-ramp" repeater 204 with three distinct channels of operation: channel 201 between AP 100 and hi-way repeater 200, interim channel or "off-ramp" channel 202 between hi-way repeater 200 and off-ramp repeater 204, and local channel 203 between off-ramp repeater 204 and client unit 105.

It should be noted that one or more repeaters such as hi-way repeater 200 and off-ramp repeater 204 may connect to any specific backhaul or off-ramp channel allowing an increase in coverage for any given AP 100, as communication with stations (STA), client units, or the like could be extended to the radiated foot print potentially including a plurality of repeaters rather than just a single repeater. It is further important to note that hi-way repeater 200 and off-ramp repeater 204 simply translate and rebroadcast information packets as well as beacon information thereby making them similar to repeaters described in co-pending PCT Application No. PCT/US03/16208.

Before describing the operation of an exemplary embodiment in accordance with FIG. 1, it must be understood that the present invention may be used in an environment where present wireless local area standards are used. As defined, for example, in the 1999 IEEE 802.11 wireless standards and as further shown in Table A herein below, paragraphs 15.4.6.2 and 18.4.6.2, all the channels defined for transmission with the DS parameter are in the 2.4 GHz band.

TABLE A

| CHNL-ID | Freq | X'10' FCC | X'20' IC | X'30' ETSI | X'31' Spain | X'32' France | X'40' MKK |
|---|---|---|---|---|---|---|---|
| 1 | 2412 MHz | X | X | X | | | |
| 2 | 2417 MHz | X | X | X | | | |
| 3 | 2422 MHz | X | X | X | | | |
| 4 | 2427 MHz | X | X | X | | | |
| 5 | 2432 MHz | X | X | X | | | |
| 6 | 2437 MHz | X | X | X | | | |
| 7 | 2442 MHz | X | X | X | | | |
| 8 | 2447 MHz | X | X | X | | | |
| 9 | 2452 MHz | X | X | X | | | |
| 10 | 2457 MHz | X | X | X | X | X | |
| 11 | 2462 MHz | X | X | X | X | X | |
| 12 | 2467 MHz | | | X | | X | |
| 13 | 2472 MHz | | | X | | X | |
| 14 | 2477 MHz | | | | | | X |

As will be appreciated from the above description, repeaters operate to detect signals on one of two channels and retransmit the signals on the other channel as described in detail in co-pending PCT Application No. PCT/US03/16208.

Figure 2:
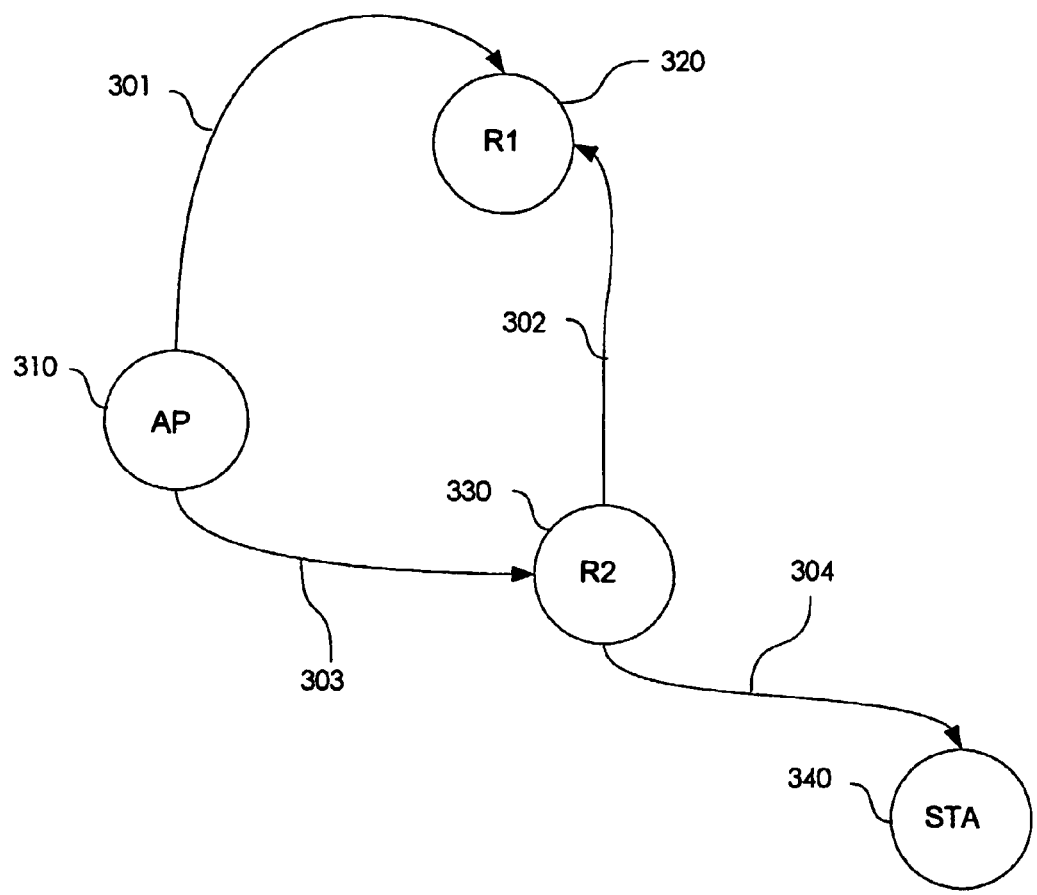
FIG. 2 is a connection diagram illustrating potential connections which may be established between exemplary repeaters, an AP and mobile communication station in a WLAN.

A problematic repeater condition may arise however, in exemplary scenario 300, as illustrated FIG. 2, wherein two repeaters R1 320 and R2 330 are configured to service one AP 310 which is within the transmit range of both repeaters via, for example, wireless connections 301 and 303. Repeaters R1 320 and R2 330 may further be capable of listening to each other's respective transmissions via a connection established over, for example, link 302. In exemplary scenario 300, the only connection established to communication unit or station device or STA 340 is connection 304 which as will be appreciated is a wireless or RF link. Problems arise when repeaters R1 320 and R2 330 are operating on the same pair of channels, such as AP and repeater channels. When AP 310 transmits, both R1 320 and R2 330 detect the transmission on, for example, a first frequency F1 and retransmit on a second frequency F2, such as the repeater channel. In some locations within the WLAN environment, there will appear to be a 700 ns multi-path signal which is easily compensated for by an 802.11a equalizer for example. The primary problems arise when an isolated client station STA 340 transmits on F2 which, as describe above, is the repeater channel. R2 330 then repeats the transmission on F1 to AP 310. R1 320 detects the transmissions from R2 330 on F1 and tries to retransmit the detected transmissions. If R1 320 happens to select F2 as the transmit frequency, a loop will be established between R1 320 and R2 330. With sufficient gain, the RF loop may oscillate, via, for example, positive feedback causing any signals destined to STA 340 over connection 304 to be jammed.

Figure 3:
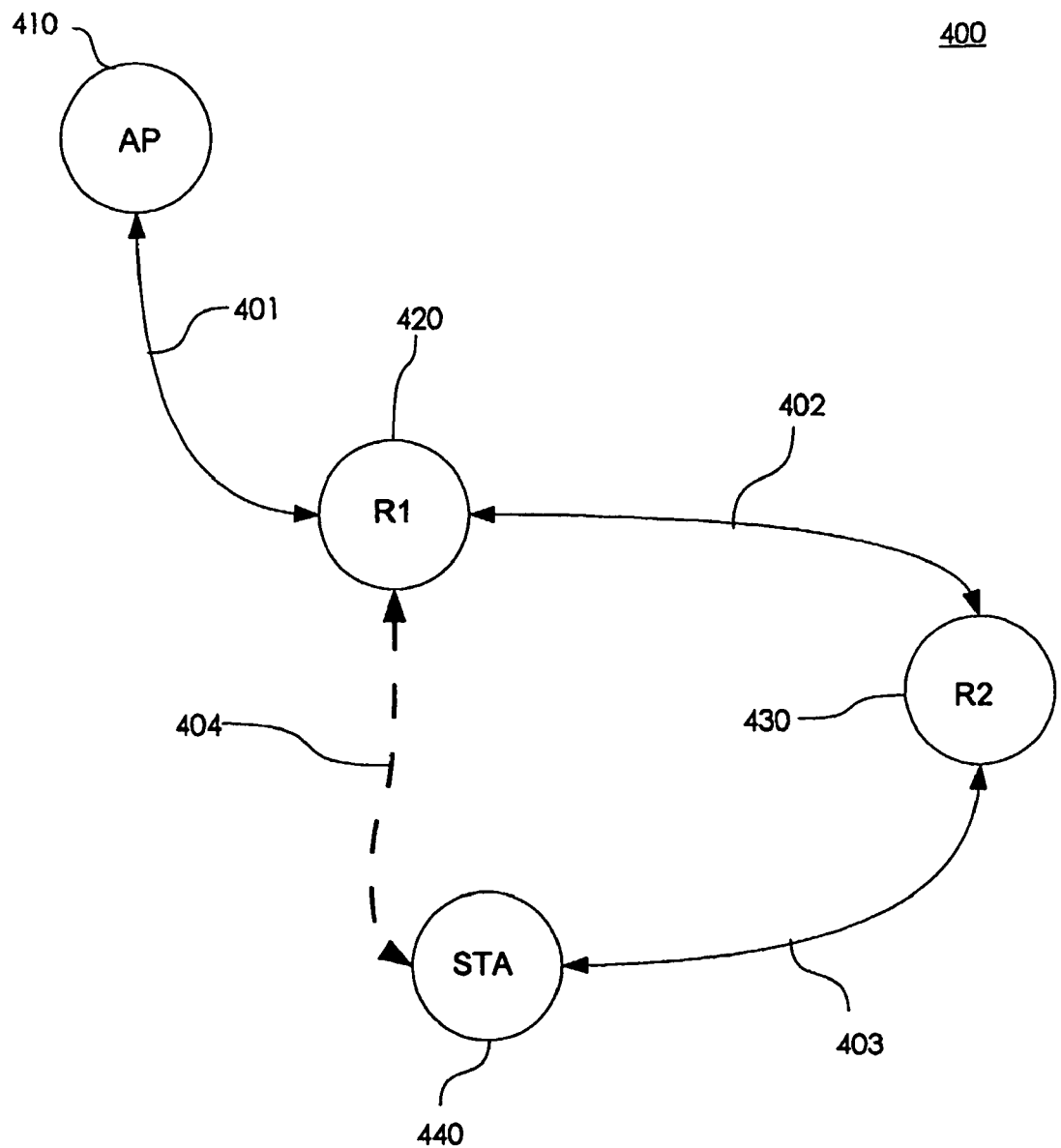
FIG. 3 is a connection diagram illustrating additional potential connections which may be established between exemplary repeaters, an AP and mobile communication station in a WLAN.

FIG. 3 illustrates another exemplary scenario 400 commonly referred to as a hidden node repeater scenario. In accordance therewith, R2 430 is connected to AP 410 via R1 420. Client station STA 440 may preferably connect to either R1 420 or R2 430 based on connection quality or the like. Assuming connection 403 to R2 430 is better, one undesirable situation can occur when connection 403 is made but is silent, such as no traffic is being generated. When R1 420 turns on it will not be able to detect the presence of R2 430 and thus cannot avoid channels associated with R2 430. A second more serious situation may occur when client station STA 440 transmits, and R2 430 repeats the transmitted signal to R1 420, which then transmits the signal to AP 410 on F1. It should be noted that in accordance with this scenario, the signal transmitted from client station STA 440 may also be detected on F1, capturing R1 420 and preventing it from repeating the signal from R2 430 back to AP 410.

Figure 4:
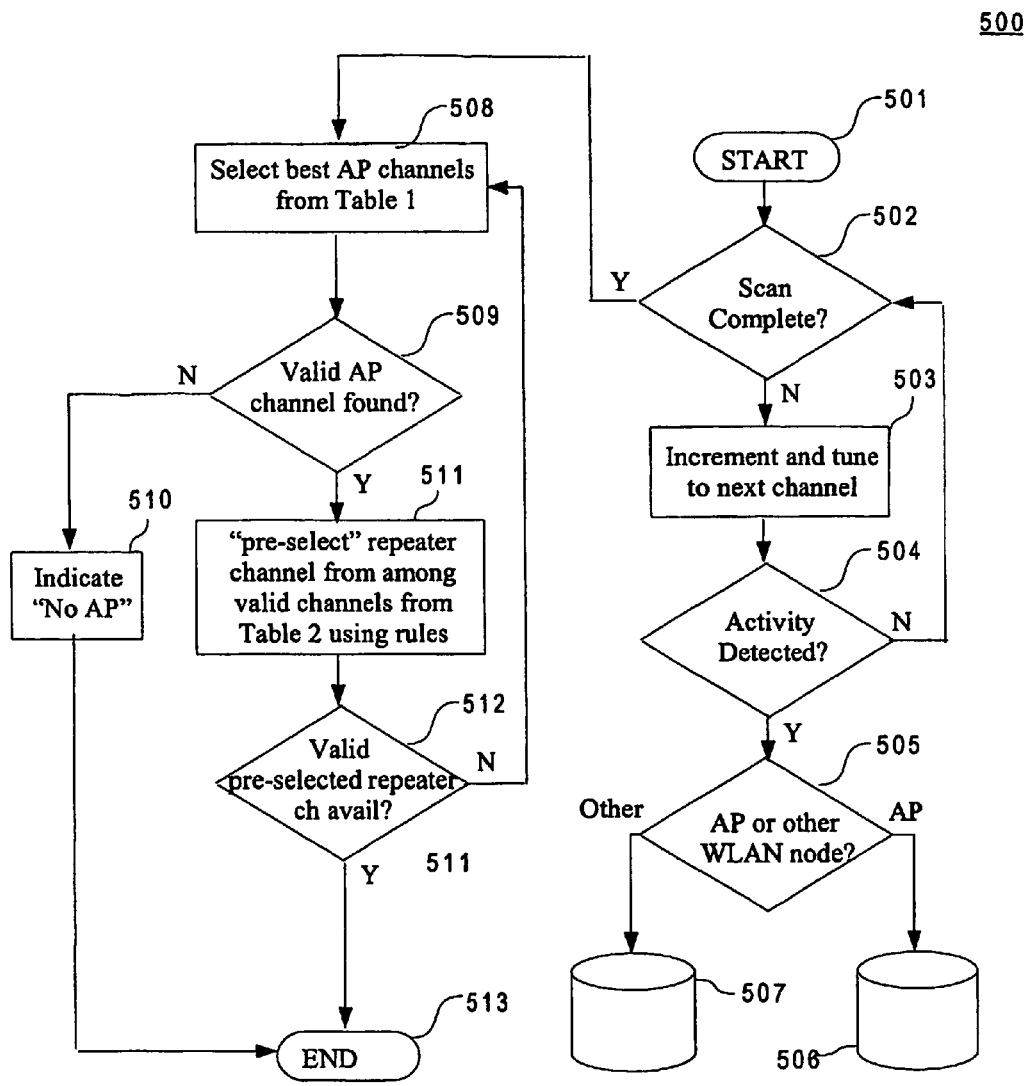
FIG. 4 is a flow chart illustrating exemplary steps associated with techniques such as passive monitoring in accordance with various exemplary embodiments.

Thus, in accordance with the present invention, techniques will be described to deal with the above described exemplary scenarios, including for example, preferred techniques also described above. In accordance with various exemplary embodiments, the present invention will prevent or significantly reduce the undesirable effects associated with the above described situations. Referring now to FIG. 4, a flow chart is shown illustrating various states which are preferably associated with for example, an exemplary state machine for initial channel selection in an exemplary passive approach further described herein below.

The feedback problems described above may be avoided or significantly reduced by careful selection of initial channels. In FIG. 4, channels are preferably incrementally, or otherwise, scanned until the scan is complete at 502. Each time a channel is to be monitored an exemplary receiver may be tuned to a new channel and may be monitored for the presence of a signal or like activity at 503. If signal activity is present at 504 an attempt may be made to qualify the activity as acting like an AP, another WLAN node, or like some undesirable signal, such as, for example, a radar or microwave oven. At 505, if no activity is present, the next channel is scanned and so on. If activity is detected, a determination may be made that the transmission possesses properties indicating WLAN transmissions at 505. Properties indicating WLAN transmissions may include but are not limited to: detection of a known power level, or a known sequence of modulated symbols; a nearly periodic transmission indicating beacon messages from an AP; a known sequence possibly encompassing entire beacon message intervals, a level of activity on the channel indicative of WLAN transmissions, and the like. The characteristics of the transmissions may further be qualified against known system parameters associated with WLAN packets such as minimum and maximum packet durations.

When activity is detected, it may be qualified, as described above, as AP or some other type of signal such as for example, an interference signal. If other, such as if the signal is deemed to be interference, its characteristics may be stored at 507 in a data storage device such as table 2 for later use, and if the signal is deemed to be associated with an AP it is stored at 506 in table 1 for later use. In accordance with various preferred exemplary embodiments, after table 1 and table 2 are completed, at 506 and 507 indicating that channel scanning is complete, the best AP channels are preferably selected in 508. If valid AP channels are found at 509, channels may be pre-selected at 511 using, for example, rules to be described in greater detail herein below.

Choosing or "pre-selecting" a repeater channel in accordance with preferred exemplary embodiments prevents two repeaters from operating on the same pair of channels. Moreover, by defining "known" or preferred channel spacing and by defining and applying usage rules, depending on which channel or channels are available for re-transmission, and which are active with transmissions that qualify as AP transmissions, channel infringement may further be avoided. It should be noted that usage rules in accordance with various exemplary embodiments may include for example, rule set A) always incrementing by two or another predefined defined number of channels from the AP channel, unless no valid channels exist, decrementing 3 channels or another predefined number of channels, if no valid channels exist; rule set B) defining a one to one valid channel mapping based on a table, mathematical equation, or other suitable method wherein every valid AP-like channel is assigned or otherwise associated with valid repeater channels and where the defined repeater channels and AP-like channel would not overlap with a repeater who is sending an AP-like signal.

One of ordinary skill in the art will recognize that the above rules are presented for exemplary purposes. Other rules may be devised for reducing or eliminating channel interference based on parameters as described herein above, or other parameters relevant to channel selection as would be appreciated by one of ordinary skill in the art. Also, one of ordinary skill will recognize that not all channels must necessarily be scanned. Rather, an exemplary WLAN in accordance with the present invention channels may be scanned and, upon finding one or more available channels, the best AP channel may be selected at 508. Table 1 at 506 and table 2 at 507 may further be used to determine the best pre-selected repeater channels.

For example, based on exemplary channel pre-selection steps as described above, at a minimum, pre-selected repeater channel or channels in Table 1 at 506 may be monitored for activity, indicating that they are either already in use by another AP or another device, or have already been selected for use as a repeater channel by another repeater or repeaters. It should be noted that the pre-selected repeater channel or channels may be disqualified if AP-like signals are detected, and the next repeater channel selected for monitoring for categorization in table 2 at 507 or table 2 at 506. It should further be noted that a conclusive determination of whether an actual AP is generating AP-like signals is not necessary. It is sufficient to determine that the signals resemble those of an AP to disqualify a channel.

Alternatively, pre-selected repeater channels could be disqualified in 509 based on monitoring both the AP-like and the prequalified repeater channels simultaneously and comparing activity parameters on the two channels to determine if the similarities are such that the transmissions on the pre-selected repeater channel is a transmission from a repeater using the same AP-like channel and the same repeater channel as being monitored. If a sufficient level of inactivity is detected on a pre-selected repeater channel, that channel may be qualified as passing the passive tests for valid use as a repeater channel, for example, in 511.

Figure 5:
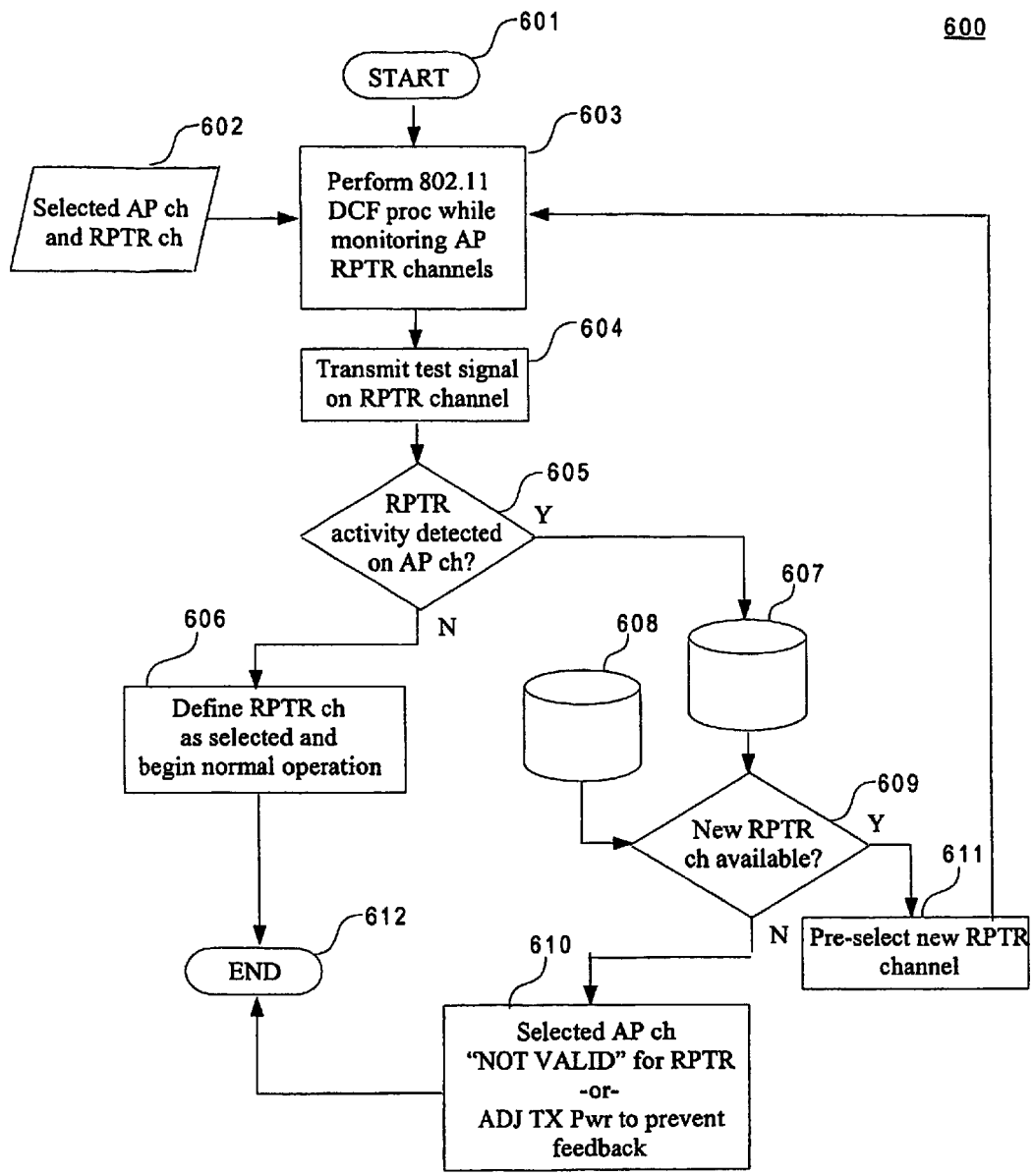
FIG. 5 s a flow chart illustrating exemplary steps associated with techniques such as active monitoring in accordance with various exemplary embodiments.

Referring now to FIG. 5, a flow chart is shown illustrating various exemplary techniques which might be associated with for example, an exemplary state machine for initial channel selection in an exemplary active approach. It should be recognized that active channel selection may preferably be performed after passive selection of the AP channel and pre-selection of the repeater channel, as an additional step to further mitigate against the effects of feedback. Alternatively, a channel could be pre-selected based on other factors, or could be randomly selected for active testing. In accordance with various preferred exemplary embodiments, a pre-selected repeater channel may be paired with a detected AP channel, and information identifying the pre-selected repeater channel stored in a storage device or the like as in 602. An exemplary repeater may then perform a distributed coordination function procedure, or the like, for example, as defined in the IEBE 802.11 MAC specification in 603—to prevent jamming other users.

When it is determined that transmission is valid, a test signal may be sent on the pre-selected repeater channel at 604. It will be appreciated that the test signal may be a frequency hopped signal, a spread spectrum signal, an OFDM signal, or may be, for example, wide band or band limited noise, such as white noise or the like. While performing the test transmission on a pre-selected repeater channel, the AP channel or AP-like channel, may be monitored, for example, at 605 to detect the presence of another repeater operating on the same two channels as the testing repeater, such as the detected AP-like channel and the pre-selected repeater channel, as defined, for example, by the testing repeater.

If a transmission is detected on the AP-link channel with the same signal parameters at 605, the AP-like signal may be defined to be a repeater signal operating on the same two channels. It should be noted that a match of the paired signals may preferably be determined based on signal parameters which may include duration, amplitude or power modulations, on/off packet times, and inter transmission intervals in situations wherein more than one transmission is sent, or the like. The matched pair of frequencies are preferably stored in a table which may be referred to as, for example, a "known repeater table" at 607. A test may be performed at 609 to determine whether other repeater channels are available, and, if so, the pre-selected repeater channel may be disqualified as valid for use, and another channel selected as a pre-selected repeater channel at 611 whereupon an exemplary process may return, for example, to 603. It should be noted that the above test transmission process, may further be performed on different channels, as derived from the AP and interference tables at 608 until no correlated or matching transmissions are detected on the AP-like paired channel. It should be noted that if no repeater activity is detected at 605 the pre-selected repeater channel is defined as valid for use as a repeater channel, and the repeater may be enabled for normal operation.

If no new repeater channels are available at 609, two actions are preferably possible: either an exemplary WLAN, or associated device or system can stop operation and declare no valid repeater channels available for operation, whereupon another AP channel may be tried, or, alternatively, gain associated with the transmitted signal may be reduced to prevent oscillation or feedback at 610. The reduced gain value may be archived by actively controlling or biasing, for example, an AGC loop in an exemplary repeater. The gain is preferably reduced until a determination is made that the possibility of RF oscillation or positive feedback is occurring is substantially reduced or eliminated. It is generally the case that if the gain is reduced and no reduction in transmit power occurs, oscillation or feedback reduction has been accomplished.

Gain may also be reduced until a linear relationship develops between transmit power and gain, such as until transmit power begins to reduce in a linear fashion with the reduction in gain level. When a state is attained where the linear relationship described above develops, it can be assumed that no oscillation is occurring. The existence of such a state may be determined by other techniques as will be apparent to those of ordinary skill in the art. It should also be noted that the reduced power state is advantageous as it allows operation to be maintained, even if under sub-optimal conditions. Further, in accordance with various exemplary and alternative exemplary embodiments, when a reduced power state is entered, an indication may be provided to the user to allow the repeater to be moved to a better location.

One of ordinary skill in the art will recognize that the above described devices such as, APs, repeaters, client devices or stations, base units or stations, and the like in accordance with various exemplary and alternative exemplary embodiments, take many forms in a wireless communication network or WLAN. For example, an exemplary AP may correspond to a base unit such as for example, an 802.11 AP connected to a wired or wireless wide area network infrastructure, including but not limited to: a Digital Subscriber Line (DSL), cable modem, PSTN, Cat5 Ethernet cable, cellular modem, or other wireless local loop type system for example in accordance with 802.16, or the like. Moreover, an exemplary WLAN or wireless network in accordance with various exemplary embodiments, may be in accordance with many different protocols, including but not limited to: 802.11, 802.11b, 802.11a, 802.11g, 8-2.16, 802.20, 802.15.3.a, and additional extensions of the 802.11 WLAN protocol, Bluetooth, TDS-CDMA, TDD-W-CDMA, or the like.

Further, while various exemplary embodiments of the present invention are described herein in the context of existing standards, such as 802.11a and 802.11b, and those additional standards and environments as described above, techniques may be practiced in an environment with different standards or different configurations without departing from the present invention. Thus, the invention is described herein in detail with particular reference to presently preferred embodiments. However, it will be understood that variations and modifications can be effected within the scope and spirit of the invention.

What is claimed is:

1. A method for operating a repeater in a wireless local area network (WLAN) having one or more repeaters and a network protocol for communicating between one or more base units and one or more client units, the one or more base units and one or more client units receiving and transmitting on at least a first frequency channel, the network protocol defining multiple operating frequencies, the method comprising:
   monitoring the multiple operating frequencies to detect a signal transmitted by one of the one or more base units on the first frequency channel;
   characterizing the signal to determine whether the signal is associated with the one of the one or more base units; and
   selecting a second frequency channel for use by at least one of the one or more repeaters for retransmission of one or more additional signals received on the first frequency channel based on the characterizing of the signal,
   wherein the selecting the second frequency channel further includes sending a test transmission on the second frequency channel, and monitoring the first frequency channel, to detect the presence of another one of the one or more repeaters operating on the second frequency channel being tested.

2. The method according to claim 1, wherein the monitoring includes tuning a detector circuit to one or more of the multiple operating frequencies to detect the signal on the first frequency channel.

3. The method according to claim 1, wherein the characterizing includes determining whether one or more base unit characteristics are associated with the signal including: a power level, a known sequence of modulated symbols, a nearly periodic transmission, a level of activity, a minimum packet duration, and a maximum packet duration.

4. The method according to claim 1, wherein the selecting the second frequency channel includes applying at least one frequency selection rule based on the characterization for selecting the second frequency channel.

5. The method according to claim 4, wherein the at least one frequency selection rule further includes selecting the second frequency channel a predetermined number of channels away from the first frequency channel.

6. The method according to claim 1, wherein the selecting the second frequency channel includes automatically selecting the second frequency channel based on the frequency of the first frequency channel.

7. The method according to claim 1, wherein the selecting the second frequency channel includes selecting the second frequency channel so as to minimize interference between the repeater and the one or more base units, one or more client units, and the one or more repeaters.

8. The method according to claim 1, wherein the selecting the second frequency channel includes monitoring the second frequency channel for a first level of activity indicating the second frequency channel is already in use.

9. The method according to claim 8, further comprising establishing the second frequency channel as a valid channel for use if the first level of activity monitored is at or below a minimum level.

10. The method according to claim 8, wherein the selecting the second frequency channel further includes disqualifying the second frequency channel for selection as a valid repeater channel if one or more signals are detected on the second frequency channel having characteristics associated with a base unit.

11. The method according to claim 10, wherein the selecting the second frequency channel further includes pre-selecting a third frequency channel if the second frequency channel is disqualified as a valid repeater channel.

12. The method according to claim 11, further comprising providing an indication if no valid repeater channel is available.

13. The method according to claim 12, further comprising providing an indication if no valid repeater channel is available that the repeater should be moved to a different physical location.

14. The method according to claim 1, wherein the selecting the second frequency channel includes determining whether the second frequency channel has already been selected for use as a repeater channel by another one of the one or more repeaters.

15. The method according to claim 1, wherein the test transmission includes one or more of: a frequency hopped signal, a spread spectrum signal, a band limited noise signal, a modulated waveform, and a broad band noise signal.

16. The method according to claim 1, further comprising reducing a transmit power of at least one of the one or more repeaters until a feedback loop is broken if the another one is determined to be operating on the second frequency channel being tested.

17. The method according to claim 16 further comprising providing an indication that the transmit power is being reduced.

18. The method according to claim 17, wherein the providing an indication includes providing an indication on an LED.

19. A method for operating a repeater in a wireless local area network (WLAN) having one or more repeaters and a network protocol for communicating between one or more base units and one or more client units, the one or more base units and one or more client units receiving and transmitting on at least a first frequency channel, the network protocol defining multiple operating frequencies, the method comprising:
   monitoring the multiple operating frequencies to detect a signal transmitted by one of the one or more base units on the first frequency channel;

characterizing the signal to determine whether the signal is associated with the one of the one or more base units; and selecting a second frequency channel for use by at least one of the one or more repeaters for retransmission of one or more additional signals received on the first frequency channel based on the characterizing of the signal, wherein the selecting the second frequency channel includes monitoring the second frequency channel for a first level of activity indicating the second frequency channel is already in use, and further wherein the selecting the second frequency channel further includes monitoring the second frequency channel for the first level of activity and monitoring the first frequency channel for a second level of activity and comparing the first level of activity and the second level of activity to determine if transmissions on a pre-selected repeater channel is a transmission from another one of the one or more repeaters using the first frequency channel and the second frequency channel and disqualifying the second frequency channel as a valid repeater channel if the transmission are determined to be transmissions from the another one.

20. A method for operating a repeater in a wireless local area network (WLAN) having one or more repeaters, a network protocol for communicating between one or more base units and one or more client units, the one or more base units and one or more client units receiving and transmitting on at least a first frequency channel, the network protocol defining multiple operating frequencies valid for operation in the WLAN, the method comprising:

detecting one or more signals on one or more of the multiple operating frequencies;

identifying a wireless transmission on a first one of the multiple operating frequencies;

pre-selecting a second channel for use by the repeater based on at least one rule;

monitoring the second frequency channel for the presence of the one or more signals indicating the wireless transmission;

setting the repeater to operate on the first frequency channel and the second frequency channel if a number of the one or more signals is at or below a minimum value; and sending a test transmission on the second frequency channel, and monitoring the first frequency channel to detect the presence of another one of the one or more repeaters operating on the second frequency channel being tested.

21. The method according to claim 20, further including providing an indication if no presence is detected for the repeater to be moved to a different physical location.

22. A method for operating a repeater in a wireless local area network (WLAN) having one or more repeaters, a network protocol for communicating between one or more base units and one or more client units, the one or more base units and one or more client units receiving and transmitting on at least a first frequency channel, the network protocol defining multiple operating frequencies valid for operation in the WLAN, the method comprising:

detecting one or more signals on one or more of the multiple operating frequencies indicating the presence of one or more wireless transmissions on at least a first frequency channel of the multiple operating frequencies;

pre-selecting a second frequency channel for use by the repeater;

detecting the one or more signals on the second frequency channel indicating the presence of the one or more wireless transmissions on the second channel;

setting the repeater to operate on the first frequency channel and the second frequency channel a number of the one or more signals is at or below a minimum value;

transmitting a test signal on the second frequency channel and monitoring the first frequency channel; and qualifying the second frequency channel as a valid channel for operation of the repeater if no other of the one or more repeaters is operating on the first frequency channel and the second frequency channel, otherwise if an other repeater is operating the first frequency channel and the second frequency channel, reducing a power level associated with the test signal to determine a transmission level preventing a feedback loop with the other repeater, and setting the repeater to transmit at the determined level.

23. In a wireless network having one or more repeaters, a network protocol for communicating between one or more base units and one or more client units, the one or more base units and one or more client units receiving and transmitting on at least a first frequency channel of at least two frequency channels, the network protocol defining multiple operating frequencies, an apparatus for enhancing coverage of the wireless network comprising:

a frequency translating repeater configured to:

monitor the multiple operating frequencies to detecting a signal transmitted by one of the one or more base units on the first frequency channel;

characterize the signal to determine whether the signal is associated with the one of the one or more base units; and select a second frequency channel for use by the frequency translating repeater for retransmission of one or more additional signals received on the first frequency channel based on the characterizing of the signal, wherein selecting the second frequency channel further includes having the repeater send a test transmission on the second frequency channel, and monitor the first frequency channel, to detect the presence of another one of the one or more repeaters operating on the second frequency channel being tested.

24. The apparatus according to claim 23, wherein the frequency translating repeater is further configured to provide an indication if no frequency channels are available for the selecting.

25. The apparatus according to claim 24, wherein the indication includes indicating that the frequency translating repeater should be moved to a different physical location.

26. The apparatus according to claim 23, wherein the frequency translating repeater is further configured exclusively as a physical layer repeater.

27. The apparatus according to claim 23, wherein the frequency translating repeater is further configured exclusively as an RF signal repeater.

28. In a wireless network including one or more base units and one or more client units, the one or more base units capable of transmitting on a first one of the at least two frequency channels and the one or more client units capable of transmitting on a second one of the at least two frequency channels, the wireless network having multiple operating frequencies, an apparatus for enhancing coverage of the wireless network comprising:

a frequency translating repeater configured to:

detect one or more signals on one or more of the multiple operating frequencies;

identify a wireless transmission on a first one of the multiple operating frequencies;

pre-select a second channel for use by the frequency translating repeater based on at least one rule;

monitor the second frequency channel for the presence of the one or more signals indicating the wireless transmission;

set the frequency translating repeater to operate on the first frequency channel and the second frequency channel if a number of the one or more signals is at or below a minimum value; and send a test transmission on the second frequency channel, and monitor the first frequency channel to detect the presence of another one of the one or more repeaters operating on the second frequency channel being tested.

29. The apparatus according to claim 28, wherein the frequency translating repeater is further configured to provide an indication if no frequency channels are available for the setting.

30. The apparatus according to claim 29, wherein the indication includes indicating that the frequency translating repeater should be moved to a different physical location.

31. The apparatus according to claim 28, wherein the frequency translating repeater is further configured exclusively as a physical layer repeater.

32. The apparatus according to claim 28, wherein the frequency translating repeater is further configured exclusively as an RF signal repeater.

33. An apparatus for enhancing coverage of a local area wireless network (WLAN) having a network protocol for communicating between one or more base units and one or more client units, the one or more base units and one or more client units receiving and transmitting on at least a first frequency channel, the network protocol defining multiple operating frequencies, the apparatus comprising:

means for monitoring the multiple operating frequencies to detect a signal transmitted by one of the one or more base units on the first frequency channel;

means for characterizing the signal to determine whether the signal is associated with the one of the one or more base units;

means for selecting a second frequency channel for use by at least one of the one or more repeaters for retransmission of one or more additional signals received on the first frequency channel based on the characterizing of the signal;

means for sending a test transmission on the second frequency channel; and means for monitoring the first frequency channel to detect the presence of another one of the one or more repeaters operating on the second frequency channel being tested.

34. A computer readable medium comprising instructions which execute on a processor for operating a repeater in a wireless local area network (WLAN) having one or more repeaters and a network protocol for communicating between one or more base units and one or more client units, the one or more base units and one or more client units receiving and transmitting on at least a first frequency channel, the network protocol defining multiple operating frequencies, the medium further comprising:

instructions to monitor the multiple operating frequencies to detect a signal transmitted by one of the one or more base units on the first frequency channel;

instructions to characterize the signal to determine whether the signal is associated with the one of the one or more base units;

instructions to select a second frequency channel for use by at least one of the one or more repeaters for retransmission of one or more additional signals received on the first frequency channel based on the characterizing of the signal;

instructions to send a test transmission on the second frequency channel; and instructions to monitor the first frequency channel to detect the presence of another one of the one or more repeaters operating on the second frequency channel being tested.

* * * * *